Figure 3:
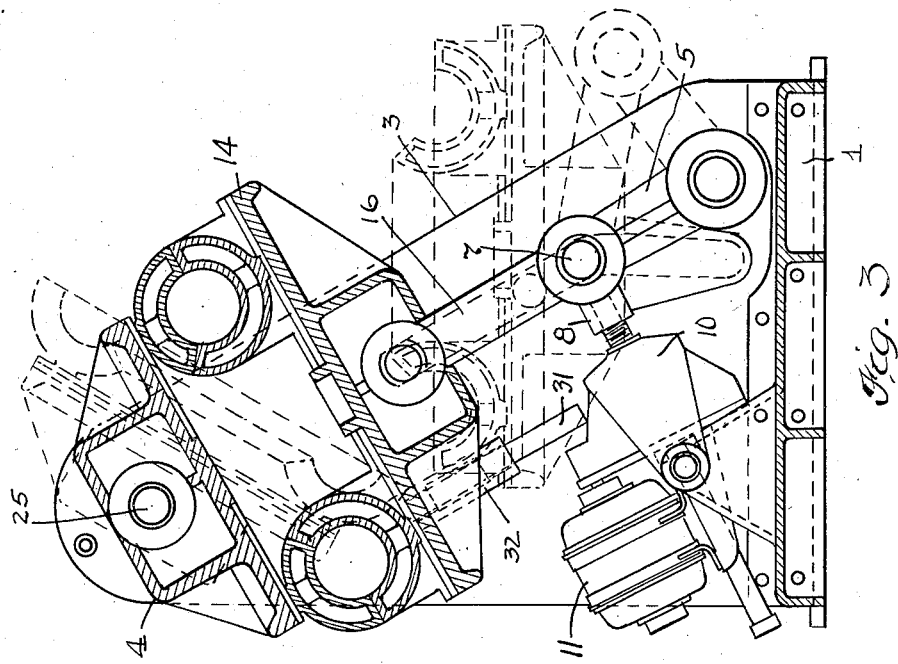

Feb. 21, 1939.　　J. W. BRUNDAGE　　2,148,416
VULCANIZER
Filed Sept. 28, 1936　　3 Sheets-Sheet 1
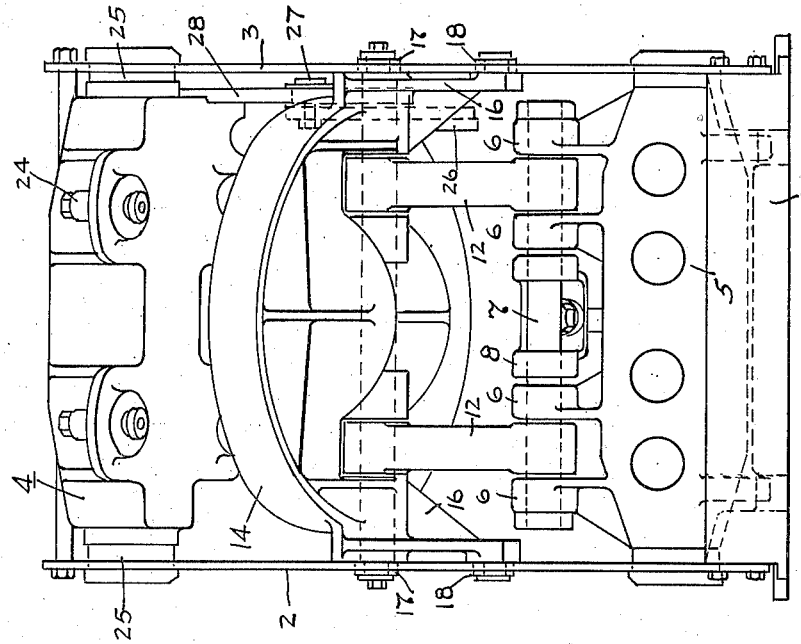
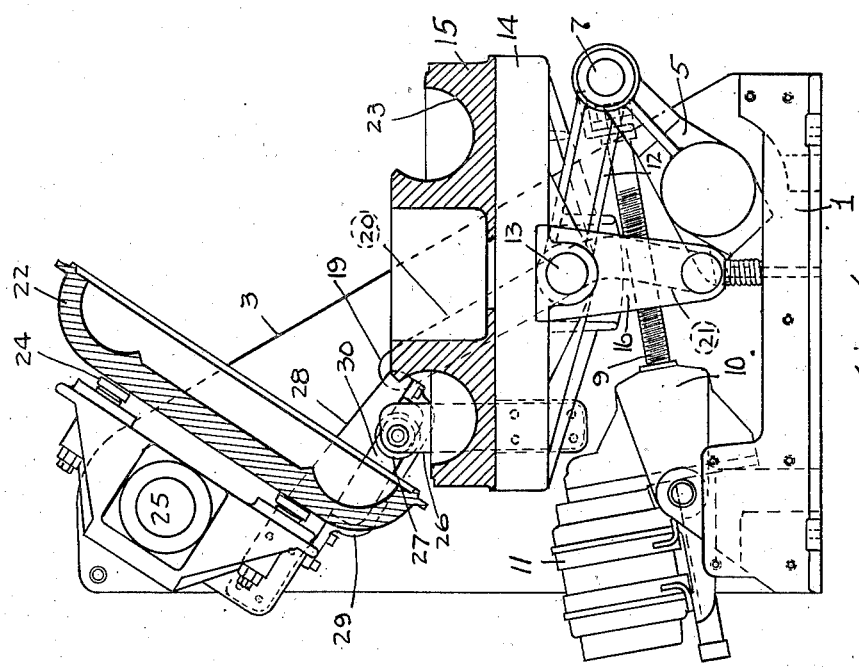
INVENTOR.
James W. Brundage
BY Fay, Oberlin & Fay
ATTORNEYS Feb. 21, 1939.    J. W. BRUNDAGE    2,148,416
VULCANIZER
Filed Sept. 28, 1936    3 Sheets—Sheet 2

INVENTOR.
James W. Brundage
BY Fay, Oberlin & Fay
ATTORNEYS

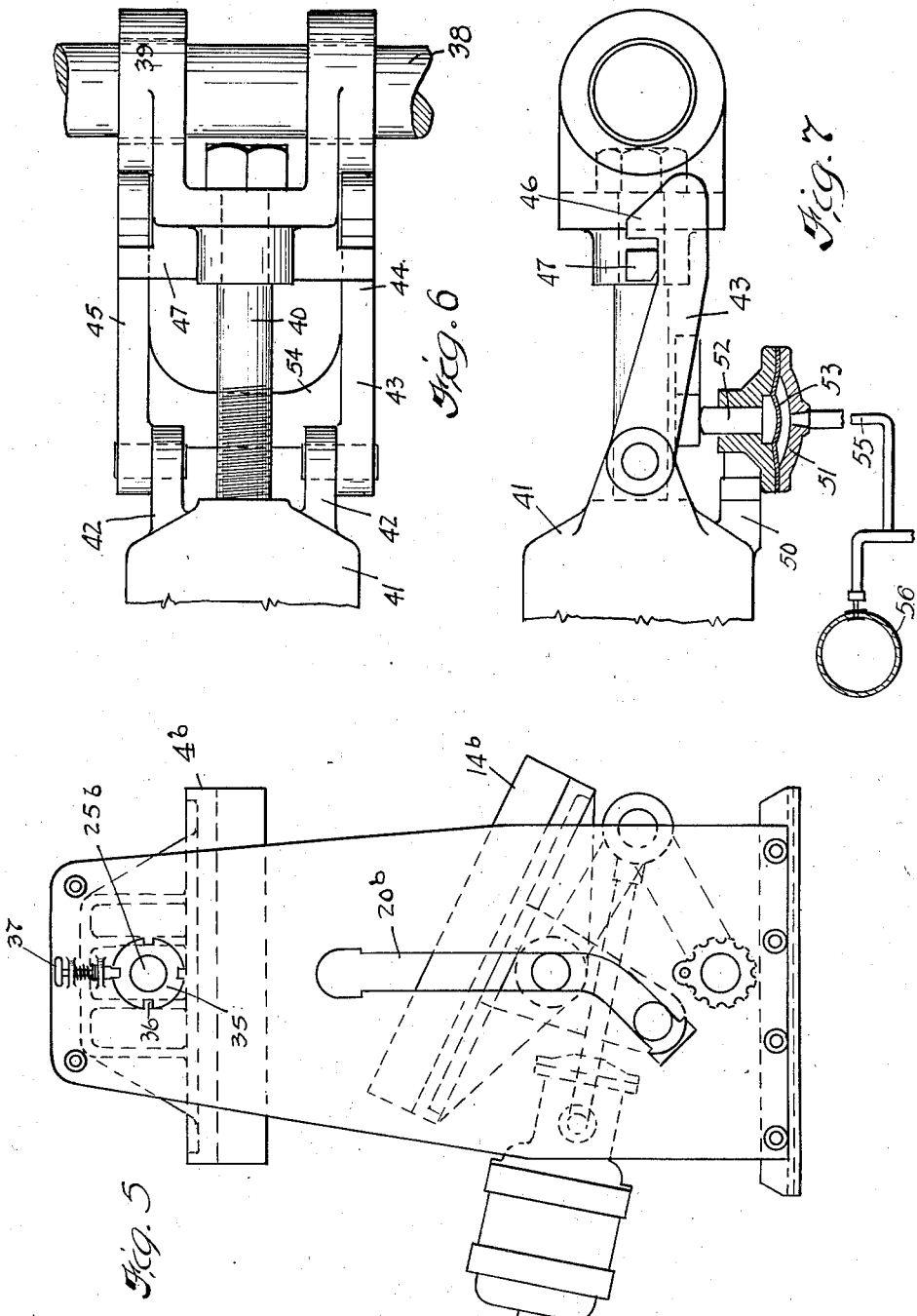

Patented Feb. 21, 1939

2,148,416

UNITED STATES PATENT OFFICE 2,148,416

VULCANIZER

James W. Brundage, Akron, Ohio, assignor to The Summit Mold & Machine Company, Akron, Ohio, a corporation of Ohio Application September 28, 1936, Serial No. 102,934

11 Claims. (Cl. 18—17)

This invention relates as indicated to vulcanizers and while throughout the ensuing description apparatus particularly adapted to be used in curing tires and tubes will be referred to, it will be noted, however, that the principles of my invention are applicable to molding and curing presses generally.

The type of apparatus to which my invention particularly relates and which is commonly referred to as a vulcanizer usually consists of a single pair of mold sections respectively mounted on relatively movable press heads adapted to be brought together by any suitable power means to secure and support therebetween the article to be cured.

The prior art devices of this general character may be divided into two principal classes: First, apparatus in which the mold sections are respectively mounted on press heads which move relatively toward and away from each other in a straight line and actuated by any suitable power means; and second, apparatus commonly referred to as a watch case type of vulcanizer in which the mold halves are respectively mounted on supporting heads which are hingedly connected to each other and likewise moved into and out of engagement with each other by rotation by either one or both mold supporting heads about their pivotal axes and under the influence of suitable power means.

In the first described form of apparatus, considerable difficulty is experienced in properly positioning the article to be molded between the mold halves prior to the curing operation and in removing the cured article after the completion of the curing operation, this being due to the fact that the mating faces of the mold halves lie directly one above the other, thus restricting the space within which the operation of inserting and removing the article may be performed.

The principal objection to the second-named form of prior art apparatus resides in the fact that the mating mold halves do not move into and out of the closed position by relative rectilinear movement so that a certain amount of scuffing and pinching of the edges of the article adjacent the hinge connection between the mold halves usually results.

In the curing of articles such as tires and tubes it is also desirable that the faces of the mold sections which, when such sections are in the closed position define the matrix within which the article is cured, be inspected and thoroughly cleaned prior to each molding operation, and to this end it is desirable to have such faces of the molds, when the press is in the open position, available for easy inspection and cleaning.

It is a principal object of my invention, therefore, to provide an apparatus of the character described in which the mating mold sections move into and out of the closed position by relative rectilinear movement and which, in their open position, have their faces presented to one side of the press for ready and easy cleaning and inspection.

It is a further and more particular object of my invention to provide an apparatus having the above-named desirable characteristics which is simple in operation, light in weight and which may be consequently, economically manufactured without any sacrifice with respect to durability, strength and rigidity.

It is a further and more particular object of my invention to provide an apparatus of the character described in which there is provided means whereby at least one of the complementary mold sections carried by the respective press heads may be adjustably secured with respect to the head carrying the same in order to insure a proper mating of the mold sections when the same are relatively moved to the closed position.

Other objects of my invention will appear as the description proceeds.

To the accomplishment of the foregoing and related ends, said invention, then consists of the means hereinafter fully described and particularly pointed out in the claims, the annexed drawings and the following description setting forth in detail certain means and one mode illustrating, however, but one of the various ways in which the principle of the invention may be used.

Figure 4:
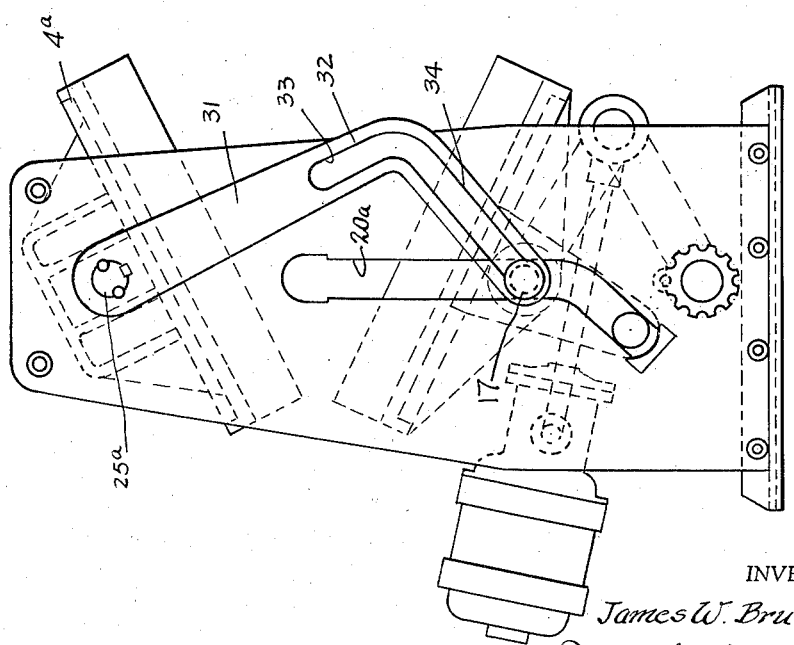

In said annexed drawings:

Fig. 1 is a transverse sectional view of one form of apparatus constructed in accordance with the principles of my invention; Fig. 2 is a right side view of the apparatus illustrated in Fig. 1 showing the lower platen in the closed position and the upper platen of the press removed in order to somewhat more clearly show the various parts of the press; Fig. 3 is a transverse sectional view of an apparatus generally similar to that illustrated in Fig. 1 but showing a modified form of particularly that structure employed for the purpose of relatively tilting the press heads during the opening and closing movement thereof; Fig. 4 is a side elevational view of an alternative form of construction according to my invention; Fig. 5 is yet another side elevational view showing a further modification of the apparatus constructed in accordance with my invention; Fig. 6 is a fragmentary elevational view of a portion of the apparatus illustrated in Figs. 1 and 2 and Fig. 7 is a side elevational view of the apparatus shown in Fig. 6.

Referring now more specifically to the drawings and more especially to Figs. 1 and 2, the press herein illustrated comprises a bed plate 1 upstanding from which on opposite sides thereof are side plates 2 and 3, which, at their upper ends, pivotally support about a fixed axis the upper head 4 of the press.

Pivotally supported in the lower ends of the side plates 2 and 3 is a main toggle arm 5 which is provided with upstanding spaced arms 6. A shaft 7 extends through and is supported by the arms 6 and centrally thereof has rotatably mounted thereon a head 8. The head 8 has the forward end of a power screw 9 secured thereto, the rear end of which screw passes through a speed reducer housing 10 of conventional construction and which has a motor 11 associated therewith. A drive nut rotatably mounted in the speed reducer housing 10 and driven by the motor 11 is threaded on the shaft 9 and such nut secured against axial movement with respect to the housing 10. The drive nut is connected by means of a suitable train of gears in the housing 10 to the shaft of the motor 11 so that rotation of the motor results in a consequent rotation of the drive nut and a movement of the screw 9 with respect to the housing 10 depending upon the direction of rotation of the motor. The foregoing construction is entirely conventional in the art and it is, therefore, believed the same need not be particularly illustrated.

Rotatably supported at their lower ends on the shaft 7 are secondary toggle arms 12, which, at their upper ends, are rotatably secured to a shaft 13 carried by the lower press head 14. A conventional mold half 15 is mounted on the lower press head 14.

Fixedly secured to the opposite sides of the lower press head 14 are trunnion arms 16 which carry spaced trunnions 17 and 18. The upper pair of trunnions 17 are axially aligned and the lower pair of trunnions 18 are preferably axially aligned.

The trunnions 17 and 18 extend into slots 19 in the side frames 2 and 3, which slots consist of an upper inclined portion generally indicated at 20 and a lower substantially vertical portion generally indicated at 21. The function of the trunnions 17 and 18 operating in the slots 20 and 21 is to guide and properly position the lower mold head during all positions of the latter during the operation of the press.

Carried by the upper mold head 4 is the upper mold half generally indicated at 22 and which, when in engagement with the lower mold half 15 defines therebetween a cavity generally indicated at 23 within which the article to be cured is positioned. The upper mold half 22 is adjustably supported by means of screws 24 on the upper press head 4. Such screws perform two principal functions in addition to that of connecting the upper mold half 22 to its supporting head 4.

First, the adjusting screws 24 make possible the proper alignment between the lower and upper mold halves so that such mold sections will both lie in exactly the same plane when in the closed position and accordingly no opening around any portion of the parting line occurs when the mold halves are thus properly aligned.

The second and perhaps the most principal function of the adjusting screws 24 is to vary the distance between the plane of the face of the mold and the axis of its supporting shaft 25. As most clearly illustrated in figures such as 2 and 3 the primary and secondary toggle levers 5 and 12 respectively are, when the mold section is in the closed position, in substantial alignment making possible the insertion of numerous peripheries between the mold faces by a minimum of tension or pressure on the actuating screw 9.

It is essential for the proper and most efficient operation of the press that the mold sections 15 and 22 move into engagement just prior to the time when the toggle arms 5 and 12 move into a straight line. This fineness of adjustment is secured by the adjusting screws 24 and thus it is possible to adjust the press after the various parts are assembled so that the mold halves close in the most efficient manner.

The trunnions 17 and 18 guide the movement of the lower press head and accordingly, the platen carried thereby in the following particular manner: When both trunnions are in the upper inclined portion 20 of the slot 19, the face of the lower mold half 5 is normal to the line of closing movement of such lower mold half. This is accomplished by having the axes of the trunnions 17 and 18 on a line at right angles to the face of the lower mold half. The inclined portion 20 of the slot 19 is arranged so that the center line thereof intersects the axis of the trunnions 25 which pivotally support the upper press head 4. The relative angular movement of the upper press head 4 with respect to the lower press head is controlled by the following means:—

The lower press head carries a piston abutment generally indicated at 26 on which is mounted a roller 27. Carried by the upper mold head 4 is a depending abutment 28 and to such last-named abutment there is secured a U-shaped strap 29 which engages the faces of the roller 27 opposite to that which is engaged by the abutment 28. The strap 29 and the abutment 28 therefor provide a slot generally indicated at 30 within which the roller 27 moves during the opening and closing movement of the press.

When the roller press head 14 is in the uppermost position so that both trunnions 17 and 18 are in the inclined portion 20 of the slot 19, the roller 27 operating in the slot 30 will maintain the plane of the upper press head parallel to the plane of the lower press head. Now, as the lower press head descends, the latter trunnions 18 move into the lower portion 21 of the slot 19 causing a tilting of the lower press head 14 which, through the action of the roller 27 in the slot 30, results in a tilting of the upper press head 4. From the foregoing, it will be noted that when the upper and lower press heads are adjacent one another, i. e., in and next to the closed position, the relative movement between the two press heads is in a truly rectilinear fashion. However, after the press heads have separated for a distance sufficient for the same to clear the work supported therebetween, they are tilted in such a position as to facilitate inspection of the mold halves, and a reloading of the press for the next cure. The construction illustrated in Fig. 3 is substantially identical with that shown in Figs. 1 and 2 excepting that instead of relying on the action of the roller 27 in the slot 30 in the manner previously described for the purpose of relatively tilting the two press heads during the opening and closing of the press, the construction in Fig. 3 employs the following mechanism:

The upper press head carries a depending rod 31 which is slidably embraced in a tubular guide 32 fixedly secured to the lower press head. The function and operation of this modified device is substantially identical with that described in connection with Fig. 1 so that a further description of the construction illustrated in Fig. 3 is believed unnecessary. It is to be noted that corresponding parts in Fig. 3 have been given the same reference characters as those employed in designating the parts of Figs. 1 and 2.

Instead of employing either expedient such as those illustrated in Figs. 1 and 3, respectively, it is within the contemplation of my invention to provide a construction such as that illustrated in Fig. 4 and which is characterized by a slightly different means for relatively tilting the two press heads.

In Fig. 4 the upper press head 4a is pivotally supported on trunnions such as 25a similar to the corresponding parts of the previously described forms of construction. In Fig. 4, however, the trunnions 25a have keyed thereto an angle-shaped depending arm 31 which, at its lower end, is provided with a slot 32 into which extend the upper pair of trunnions 17, which likewise assist in guiding the movement of the lower press head. The slot 32 is divided into two sections 33 and 34 respectively, the former being in axial alignment with the axis of the trunnion 25a and the latter being angularly related thereto.

It will be observed that the press illustrated in Fig. 4 is in the open position. As such press is closed, the trunnion 17 moving upwardly in the slot 20a results in a clockwise rotation of the arm 31 as a result of such arm being required to follow the movement of the trunnion 17. Such clockwise movement continues until the trunnion 17 enters the section 33 of the slot 32 whereupon the subsequent relative movement between the two press heads will be in a truly rectilinear fashion. The opening movements of the press illustrated in Fig. 4 are, of course, a reversal of the closing movements just described.

In Fig. 5 there is illustrated a further modification of the apparatus illustrated in the previous figures, such construction differing from those previously described principally in the manner in which the upper mold head 4b is supported and tilted to a position angularly related to that which the head occupies during the curing operation.

In Fig. 5, the upper press head is provided with the usual trunnions 25b by which the same is rotatably supported between the side plates or frames of the machine. Such trunnions in the constructions under consideration, however, have collars generally indicated at 35 secured thereto, which collars are provided with notches such as 36 conveniently spaced about the periphery of the collars. Slidably supported on the side plates of the machine and adjacent to the collars 35 are spring-actuated latches generally indicated at 37 and each latch provided with a plunger adapted to engage the notches 36 and thus secure the press head 4b in any one of several selected positions.

The construction illustrated in Fig. 5 may be employed under conditions such that the upper mold half of the press need be inspected only at rare intervals. When it is desired to inspect the upper mold head of the press, the latch 37 is elevated and the press head rotated to the desired position and the latch 37 then permitted to descend to engage in one of the notches 36 which will result in a securing of the upper press head in such position until inspection or other treatment is completed whereupon the head may be restored to the position illustrated in the drawings.

As presently indicated, processes of the character to which this invention relates are usually employed for the purpose of curing or vulcanizing hollow rubber articles which, during the curing stage, are subjected to internal pressure, either air, steam or hot water. This is accomplished by the insertion of a curing bag in the article to be cured, which bag is then inflated by the particular pressure medium selected. Some means must generally be provided to insure that the press cannot be opened so long as there is substantial pressure within the article to be cured. If the press were opened before there has been a reduction in the pressure within the article, such pressure would result in a bursting of the curing bag with dangerous consequences to workers who may be in the vicinity of the press.

A safety device by which such accidental opening of the press may be insured against while substantial pressure remains in the article to be cured is illustrated in Figs. 6 and 7.

In these last-named figures the shaft 38 corresponds to the shaft 7 of the construction illustrated in Figs. 1 and 2. The head 39 corresponds to the head 8. The screw 40 corresponds to the screw 9 and the end of the speed-reducing housing 41 corresponds to the end of the housing 10.

Projecting forwardly from the housing 41 on opposite sides of the screw 40 are ears 42 on which is pivotally supported a U-shaped hook generally indicated at 43. The U-shaped hook 43 has two parallel forwardly projecting portions 44 and 45 which at their extreme forward ends are provided with hook-shaped terminals most clearly illustrated at 46 in Fig. 7.

The head 39 has laterally extending ears 47 either secured thereto or formed integrally therewith and so arranged as to lie in the path of the hooks 46 when the latter are elevated.

Mounted on a bracket 50 extending forwardly of the speed reducer housing 41 is a pressure responsive diaphragm valve generally indicated at 51 and which is provided with a plunger 52 and a flexible diaphragm 53. When pressure is introduced to the area underneath the diaphragm 53, the plunger 52 will be elevated until the upper end strikes the plate 54 forming the bridge across the hook members 44 and 45, thus elevating both hooks into line with the projections 47.

The pressure responsive diaphragm valve 51 is connected to the fluid pressure supply line 55 which leads to the curing bag 56 within the article to be cured. As long as any pressure is present in the curing bag, the hooks 46 will lie in the path of the projections 47 thus locking the press against being opened either manually or by energization of the motor 11.

Should the motor 11 be energized by the usual time control mechanism employed in connection with apparatus of this character for the purpose of opening the press at the end of the curing cycle without, however, there having been the necessary reduction of the pressure in the curing bag, the hooks 46 engaging the projections 47 will stall the motor and the motor then be de-energized by the provision of conventional over-load relays employed in connection with apparatus of similar nature.

The safety device thus insures that the press will at all times remain positively locked against being opened while there is substantial pressure within the article to be cured. Since the safety device does not rely upon electrical connections and the like, it is believed more positive in its action than devices of a similar nature which merely attempt to inhibit the energization of the drive motor so long as substantial pressure is present in the article to be cured.

Other modes of applying the principle of my invention may be employed instead of the one explained, change being made as regards the means and the steps herein disclosed, provided those stated by any of the following claims or their equivalent be employed.

I, therefore, particularly point out and distinctly claim as my invention:

1. In a molding press, the combination of a pair of press heads, the first of said heads mounted on a fixed axis and the second head mounted on a movable axis, fixed guiding means for said second head including a cam guide, means for imparting relative rectilinear opening and closing movement to said heads, and means mechanically interconnecting said heads adapted incidental to the separating movement of said heads to angularly tilt said first head as said second head moves away therefrom.

2. In a molding press, the combination of a pair of press heads adapted to carry complementary mold sections, the first of said heads mounted on a fixed axis and a second head mounted on a movable axis, fixed guiding means for said second head including a cam guide, means for imparting relative rectilinear opening and closing movement to said heads, and means mechanically interconnecting said heads adapted incidental to the separating movement of said heads to move the same respectively into positions angularly related to the respective positions of said heads when closed.

3. In a molding press, the combination of a pair of movably supported press heads adapted to carry complementary mold sections, the first of said heads mounted on a fixed axis and the second head including a cam guide; means for imparting relative opening and closing movement to said heads, and means extending between and mechanically interconnecting said heads guiding the same for relative rectilinear opening and closing movement and effective to move such heads when the press is opened into positions angularly related to the respective positions occupied by said heads when the press is closed.

4. In a molding press, a frame, a pair of press heads movably supported by said frame, the first of said heads mounted on a fixed axis and the second head mounted on a movable axis, fixed guiding means for such second head including a cam guide arranged to maintain said head parallel with the other during the first part of its opening movement and tilting it relative thereto during the latter part of such movement, means for moving said heads relatively to each other into and out of closed and open positions, and means mechanically interconnecting said heads for translating such relative movement into angular movement by both said heads with respect to said frame as they move into and out of the open position.

5. In a molding press, a pair of press heads adapted to carry complementary mold sections the first of said heads mounted on a fixed axis and the second head mounted on a movable axis, fixed guiding means for said second head including a cam guide; means for relatively moving said heads into and out of closed and open positions, means mechanically interconnecting said heads for translating said relative movement into tilting movement both said heads as they move into and out of the open position so that when the heads are in the open position their mating surfaces are both presented to one side of the press.

6. In a molding press, the combination of a pair of movably supported press heads, means for moving one of said heads toward and away from the other to respectively close and open the press, means guiding said movable head for relative rectilinear and oscillatory opening and closing movement said other head being oscillatory about a fixed axis; and means mechanically interconnecting said heads adapted incidental to the movement of said first head to the open position to tilt said second head into position angularly related to its position when the press is closed.

7. In a molding press the combination of a pair of movably supported press heads, the first of said heads mounted for pivotal movement and the second of said heads mounted for pivotal and lineal movement, fixed guiding means for said second head including a cam guide, power means for moving said second head, means mechanically interconnecting said heads maintaining the first head stationary during at least a portion of the lineal movement of said second head and tilting the first head in an opposite direction when said second head is tilted.

8. In a molding press the combination of a pair of movably supported press heads, the first of said heads mounted for pivotal movement and the second of said heads mounted for pivotal and lineal movement, fixed guiding means for said second head including a cam guide, power means for moving said second head, mechanical means pivotally and slidably interconnecting said heads maintaining the first head stationary during at least a portion of the lineal movement of said second head and tilting said first head toward the same side of the press when second head is tilted.

9. In a molding press the combination of a pair of movably supported press heads, the first of said heads mounted for pivotal movement and the second of said heads mounted for pivotal and lineal movement, fixed guiding means for said second head including a cam guide; power means for moving said second head, mechanical means pivotally and slidably interconnecting said heads maintaining lineal movement, means for moving said second head in such fashion that it moves in a straight line out of engagement with said second head and then tilts, and means interconnecting said heads maintaining said first head in a fixed position during at least a portion of said straight line movement of said second head and tilting said second head when the first tilts.

10. In a molding press, the combination of a frame including spaced side plates having cam slots therein, an upper press head pivotally supported between said side plates, a lower press head provided with trunnions movably supporting the same in said cam slots, means for moving said lower head with respect to said side frames and into and out of engagement with said upper head, said cam slots so formed that said lower and upper heads move into and out of the closed position by relative rectilinear movement and said lower head is tilted as the same moves to the open position, and mechanical means pivotally and slidably connecting said heads to tilt the upper head as the lower head is tilted.

11. In apparatus of the character described the combination of separable mold sections which, when in contact with each other, define a curing chamber therebetween, a toggle linkage movably supporting one of said mold sections, a fluid pressure responsive device adapted to be connected with said curing chamber, and a latch actuated by said fluid pressure device for locking engagement with said toggle linkage and thus prevent said mold sections from being separated.

JAMES W. BRUNDAGE.